(12) United States Patent
Gunawardena et al.

(10) Patent No.: US 12,082,735 B2
(45) Date of Patent: Sep. 10, 2024

(54) COMMERCIAL SCALE SOUS-VIDE SYSTEM AND METHOD

(71) Applicant: John Bean Technologies Corporation, Chicago, IL (US)

(72) Inventors: Ramesh M. Gunawardena, Solon, OH (US); Owen Eugene Morey, Huron, OH (US)

(73) Assignee: John Bean Technologies Corporation, Chicago, IL (US)

(*) Notice: Subject to any disclaimer, the term of this patent is extended or adjusted under 35 U.S.C. 154(b) by 770 days.

(21) Appl. No.: 15/883,512

(22) Filed: Jan. 30, 2018

(65) Prior Publication Data

US 2018/0213963 A1  Aug. 2, 2018

Related U.S. Application Data

(60) Provisional application No. 62/452,230, filed on Jan. 30, 2017.

(51) Int. Cl.
| | | |
|---|---|---|
| *A47J 27/04* | (2006.01) | |
| *A23L 5/10* | (2016.01) | |
| *B65D 81/20* | (2006.01) | |
| *B65G 15/00* | (2006.01) | |
| *B65G 47/51* | (2006.01) | |

(52) U.S. Cl.
CPC .............. *A47J 27/04* (2013.01); *A23L 5/13* (2016.08); *A23L 5/17* (2016.08); *B65D 81/2023* (2013.01); *B65G 15/00* (2013.01); *B65G 47/5113* (2013.01); *B65G 2201/0202* (2013.01); *B65G 2207/24* (2013.01)

(58) Field of Classification Search
CPC .. A47J 27/04; A23L 5/13; A23L 15/17; B65D 81/2023; B65G 15/00; B65G 47/5113; B65G 2201/0202; B65G 2207/24
See application file for complete search history.

(56) References Cited

U.S. PATENT DOCUMENTS 2,717,415 A * 9/1955 Gerhart ................ A22C 7/00
425/408
5,243,962 A * 9/1993 Hwang .................. A21B 1/26
126/21 A (Continued)

FOREIGN PATENT DOCUMENTS

| EP | 1 797 758 A2 | 6/2007 | |
|---|---|---|---|
| LV | 14025 B | 11/2009 | |
| WO | WO-2016124301 A1 * | 8/2016 | ............. A47J 27/10 |

OTHER PUBLICATIONS

Youtube video https://www.youtube.com/watch?v=OUE7bsMOOF8 "Sous Vide Burgers". Jun. 17, 2014 by SousVide Supreme (Year: 2014).*

(Continued)

*Primary Examiner* — Nirvana Deonauth
(74) *Attorney, Agent, or Firm* — Christensen O'Connor Johnson Kindness PLLC (57) ABSTRACT

A commercial-scale sous-vide system (10) includes a conveyor (20) for carrying food products (FP) vacuum sealed in plastic food-grade pouch or container (222) through a chamber (40) heated with saturated steam. The conveyor is in the form of first and second spiral stacks (26) and (28). A control system controls the steam supply and the movement of the conveyor.

12 Claims, 6 Drawing Sheets

(56) References Cited

U.S. PATENT DOCUMENTS

| | | | |
|---|---|---|---|
| 6,148,702 A * | 11/2000 | Bucks | B26D 1/0006 |
| | | | 83/110 |
| 6,410,066 B1 | 6/2002 | Weng | |
| 7,452,266 B2 * | 11/2008 | Bottemiller | A22C 7/00 |
| | | | 452/150 |
| 10,506,822 B2 * | 12/2019 | Auernheimer | A23L 13/03 |
| 2008/0145495 A1 | 6/2008 | Burroughs et al. | |
| 2008/0260885 A1 * | 10/2008 | LaBruno | A23P 30/10 |
| | | | 425/261 |
| 2011/0217439 A1 * | 9/2011 | Morandotti | A23L 5/13 |
| | | | 426/510 |
| 2012/0100273 A1 * | 4/2012 | Guillaud | B65B 25/067 |
| | | | 426/393 |
| 2015/0010679 A1 * | 1/2015 | Strong | A23L 5/13 |
| | | | 426/233 |

OTHER PUBLICATIONS

Youtube video https://www.youtube.com/watch?v=gZlu8j_t5pA "How to cook a 1/2 pound Hamburger Sous Vide" by World of Flavor. Jul. 10, 2013. (Year: 2013).* https://www.youtube.com/watch?v=ClCBio4xJEY "Wisconsin Butter Burger Solly's Grille Copycat Butter Burger Recipe" (Year: 2017).*

Search Report and Written Opinion mailed Nov. 12, 2018, issued in corresponding Dutch Application No. 2020337, filed Jan. 29, 2018, 11 pages.

Examination Report mailed Apr. 17, 2024, issued in corresponding Canadian Application No. 2,993,366, filed Jan. 29, 2018, 6 pages.

* cited by examiner

COMMERCIAL SCALE SOUS-VIDE SYSTEM AND METHOD

CROSS-REFERENCE TO RELATED APPLICATION

This application claims the benefit of Provisional Application No. 62/452,230, filed Jan. 30, 2017, which disclosure is incorporated herein by reference.

BACKGROUND

Typically food products for commercial distribution, such as meat, poultry and fish, are first cooked to a sufficient temperature (greater than 165° F. internal temperature) to kill off any pathogens that may be on the exterior or interior of the food product, such as *E. coli*. When the food product reaches 165° F. the bacteria is killed instantaneously. However, the large amount of heat that must be conducted through the surface to the interior of the food product to achieve the 165° F. internal temperature fully cooks the food product and results in the food product becoming relatively dry and tough when reheated for serving after commercial storage and distribution. This condition is due to juices in the food product being driven out, denaturing of proteins and the rendering of fats in the food product by the heat applied thereto.

In a different approach to cooking food products, the sous-vide method has been developed of cooking food in vacuum sealed plastic pouches at relatively low temperatures for fairly long periods of time. Sous-vide differs from conventional cooking methods in three fundamental ways: (1) the raw food is vacuum sealed in a heat sealable, food grade plastic pouch; and (2) the food is cooked using precise controlled heating, to limit and control the changes to the product, and (3) the killing of the bacteria is not instantaneous, but occurs over time at the lower temperatures. The vacuum packaging prevents evaporative losses of flavor volatiles and moisture during cooking and inhibits off flavors from oxidation. The cooking for a long time at relatively low temperatures can provide a very tender product that is safe, but still not "fully cooked". This can result in a specially flavorful and nutritious food. Vacuum sealing also allows for the efficient transfer and control of thermal energy from the water bath to the food.

To date, sous-vide cooking has not been accomplished on a wide commercial scale, at least in part due to the required infrastructure. Sous-vide is typically carried out in a water bath over a long period of time. On a commercial scale of a throughput of hundreds or thousands of portions per hour, the equipment required would be extensive and the cost of operation would be high, especially with the need to precisely control the temperature of the water bath as well as the time that the food items, contained in the plastic bags or pouches, are maintained in the water bath. Consequently, a need exists for a commercially viable system and method for sous-vide cooking. The present disclosure seeks to address this issue.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A commercial scale sous-vide cooking method comprises:
vacuum packaging a food product into a food-grade plastic bag container;
placing the bag container with the food product therein in a moving transport system; and
operating the transport system to carry the food bag container with the food product therein through a fluid cooking medium at a temperature range of about 150° F. to 200° F. until a desired level of sous-vide cooking of the food product has occurred.

In accordance with a further aspect of the present disclosure, the food product is processed into a substantially uniform thickness prior to vacuum packaging of the food product into a bag container. Such thickness may be up to about 2 inches and achieved by blade or knife slicing, water jet cutting, or flattening or other means.

In accordance with a further aspect of the present disclosure, the exterior of the food product is pretreated to achieve a desired exterior or surface condition or texture or appearance. The pretreating of the exterior of the food product can include one or more of the steps of:
(a) subjecting the exterior of the food product to radiant, conductive, or convective heat source of at least 500° F.;
(b) searing the exterior surface of the food product at a temperature of at least 1000° F.;
(c) applying medium wavelength infrared radiation temperature of about 1400° F.

In a further aspect of the present disclosure, prior to vacuum packaging of the food product, the food product is marinated or brined. The marinade or brine may in part be composed of the food product itself blended with a liquid solution. Further, the marinade or brine may be injected into the food product, as well as added to the bag container prior to vacuum sealing of the container.

In accordance with a further aspect of the present disclosure, the transport system may be in the form of a conveyor on which the bags are carried, suspended, or otherwise transported. The conveyor may travel through the cooking medium comprised of saturated steam, and further the conveyor can be in the form of a spiral conveyor disposed within a housing. The temperature of the cooking medium within the housing may be monitored and adjusted so that the cooking temperature is maintained at a desired level or range.

In accordance with a further aspect of the present disclosure, the food product may be chilled or frozen after sous-vide cooking has occurred.

In accordance with a further aspect of the present disclosure, at least one process parameter pertaining to commercial scale sous-vide cooking may be controlled. Such parameter may include, for example, the temperature of the cooking medium, the percentage of steam of the cooking medium, the flow rate of the cooking medium, the loading level of the food product on the transport system, and the speed of the transport system.

The present disclosure also includes a system for sous-vide cooking of food products on a commercial scale, comprising:
(a) a steam chamber;
(b) a steam supply for supplying steam to the steam chamber;
(c) a conveyance system for carrying food products sealed in food-grade bag containers through the steam chamber; and (d) a control system for controlling the steam supply and the movement of the conveyance system, including speed, through the steam chamber.

In accordance with a further aspect of the present disclosure, the steam supply may be in the form of saturated steam.

In accordance with a further aspect of the present disclosure, the conveyance system is configured as at least one spiral stack conveyor.

In a further aspect of the present disclosure, the control system comprises a monitoring system monitoring at least the temperature within the steam chamber and the speed of the conveyance system.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

In the present application and claims, references to food products are meant to include all manner of food products that are commonly cooked. Such food products may include meat, fish, poultry, pasta, bread dough, pizza dough, or other types of dough or other types of foods.

The present application and claims in part relate to killing or eliminating pathogenic microorganisms that may be present on and/or in food products. The application also describes the killing of "bacteria" in and/or on food products. Such references to bacteria and pathogenic microorganisms relate to food pathogens, including, among others, the following: *E. coli, Salmonella* spp., *Clostridium botulinum, Staphylococcus aureus, Campylobacter jejuni, Yersinia enterocolitica* and *Yersinia pseudotuberculosis, Listeria monocytogenes, Vibrio cholerae* O1, *Vibrio cholerae* non-O1, *Vibrio parahaemolyticus* and other *vibrios, Vibrio vulnificus, Clostridium perfringens, Bacillus cereus, Aeromonas hydrophila* and other spp., *Plesiomonas shigelloides, Shigella* spp., miscellaneous enterics, and *Streptococcus*.

Figure 1:
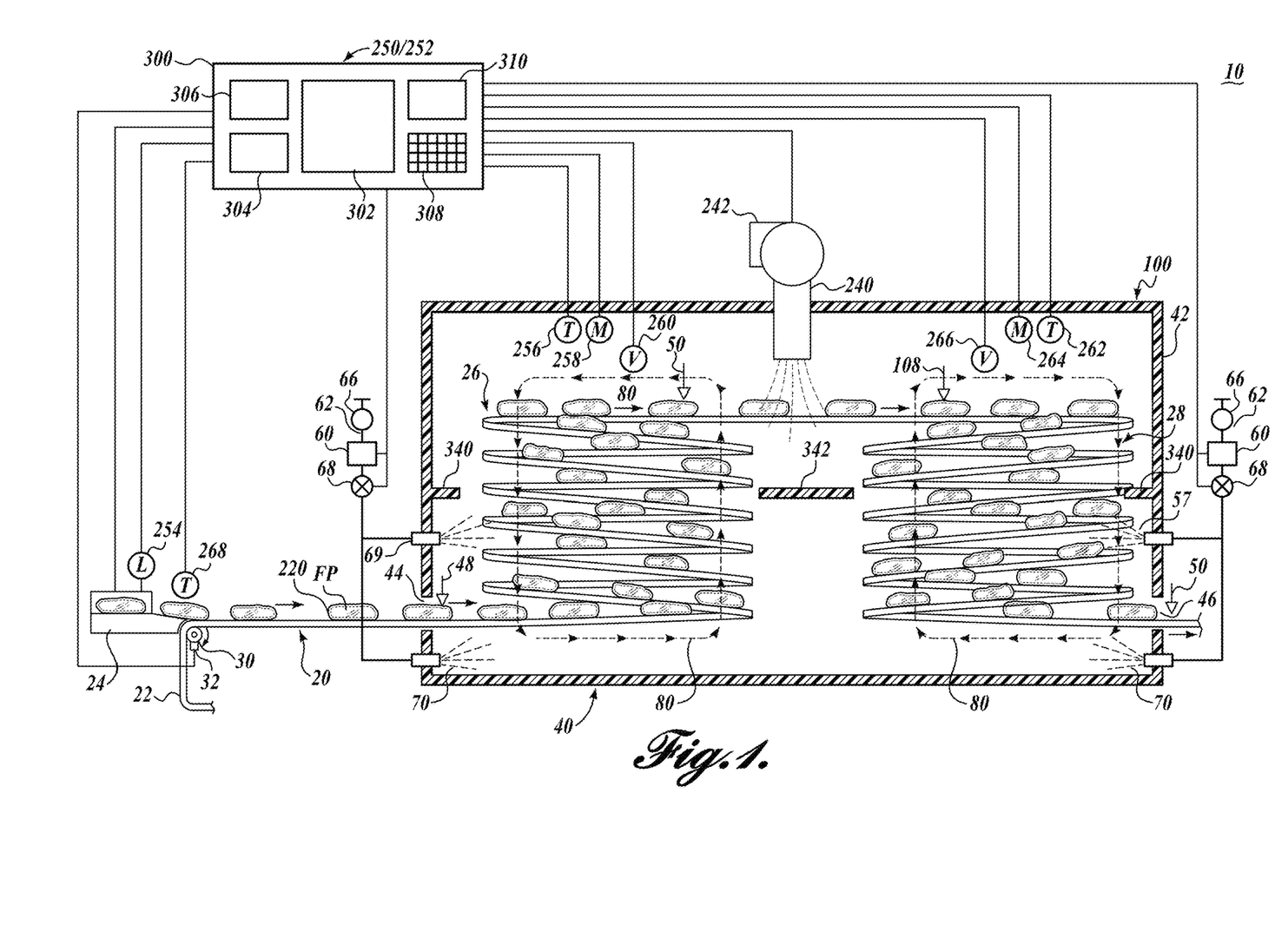
FIG. 1 is a schematic view of a sous-vide cooking system of the present disclosure.

FIG. 1 schematically illustrates one embodiment of a commercial scale sous-vide system 10 of the present disclosure. The major system/components of the sous-vide system 10 include a conveyor system 20 for conveying the food products FP that have been vacuum sealed in a plastic food-grade pouch or container 220 through the system 10, including through a chamber 40. In the chamber 40, the conveyor system is in the form of a spiral conveyor that carries the pouches or packages 220 up a first spiral stack 26 then across to a second spiral stack 28, then down the second spiral stack so as to provide a dwell time within the chamber 40 that is sufficient to complete the sous-vide cooking process as desired and at the same time killing or eliminating any pathogenic organisms that may be present on and/or in the food products FP. The chamber 40 is heated with saturated steam to create a steam-based cooking medium that is circulated through the chamber thereby to immerse the pouches 220 in the cooking medium to achieve sous-vide cooking.

Figure 2:
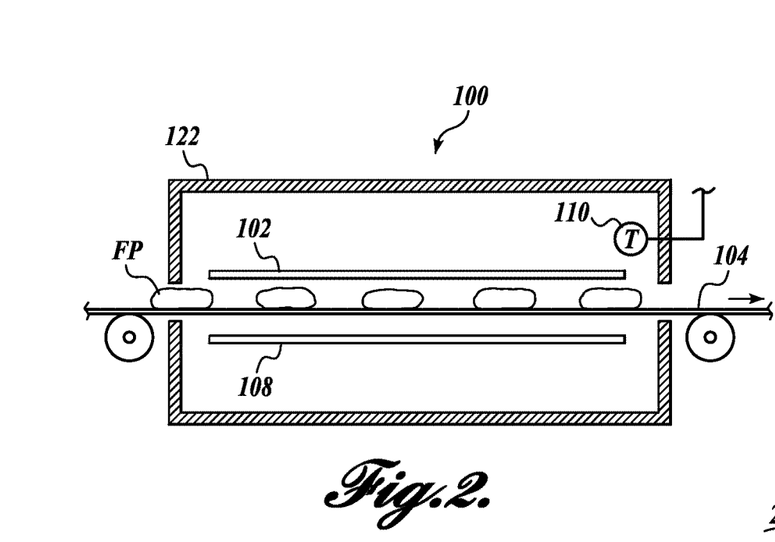
FIG. 2 is a pre-heater or searer which may be employed with a sous-vide system of FIG. 1.
Figure 3:
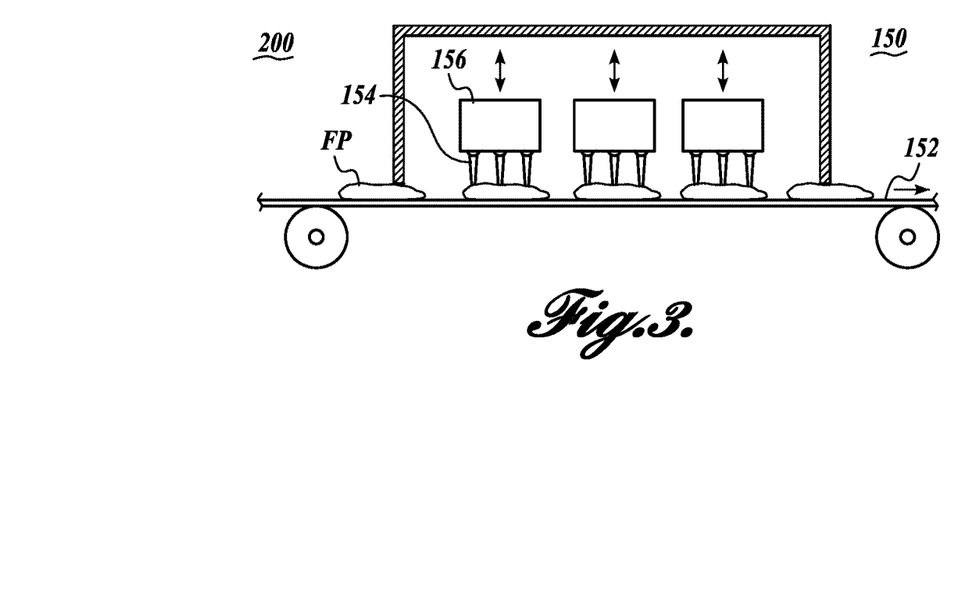
FIG. 3 is a marinader that may be optionally utilized with the sous-vide system of FIG. 1.
Figure 4:
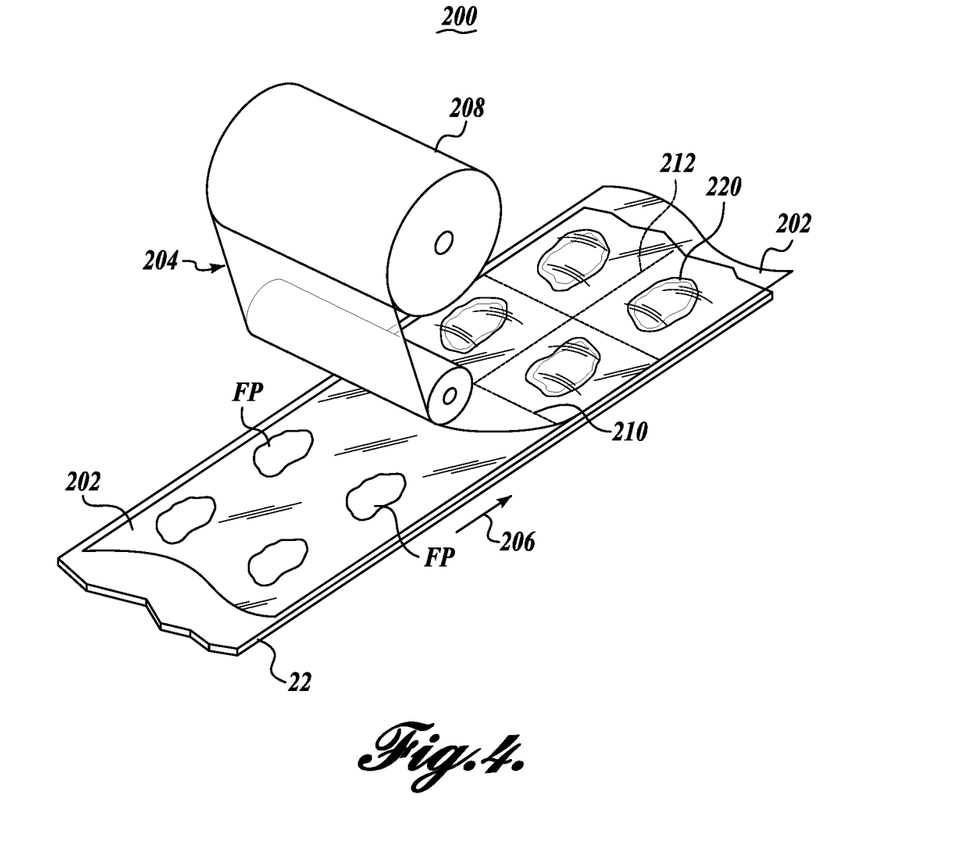
FIG. 4 illustrates an example of placing food products in a vacuum-sealed plastic pouch or container for use in the sous-vide system of FIG. 1.
Figure 6:
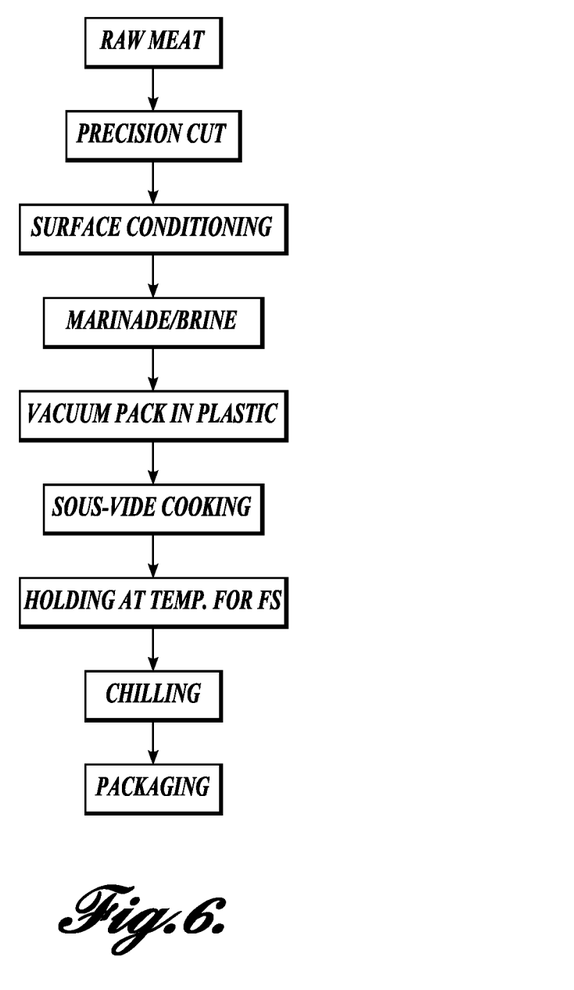
FIG. 6 is a second flow diagram of a cooking method of the present disclosure employing sous-vide cooking.
Figure 7:
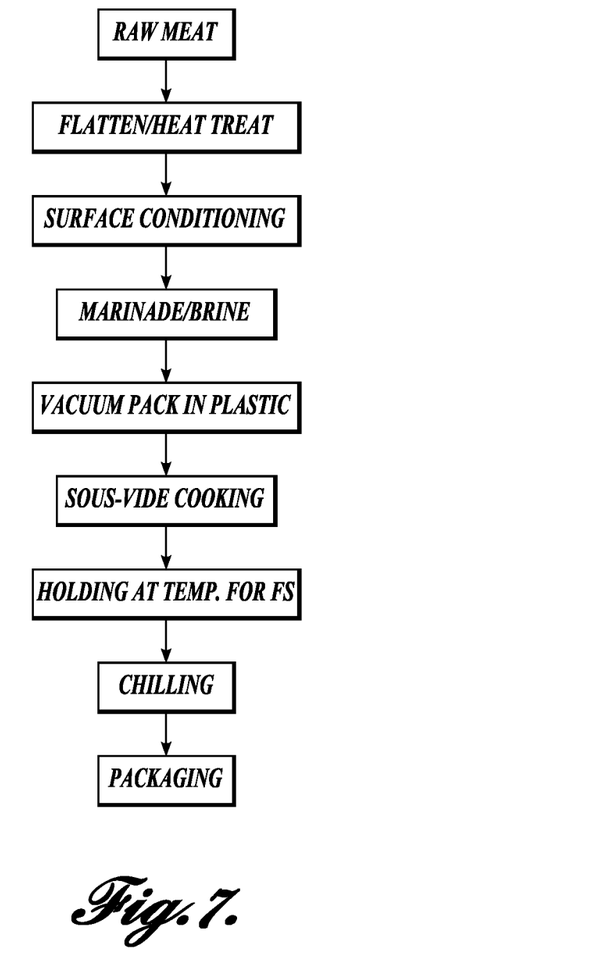
FIG. 7 is a flow diagram of a third sous-vide commercial scale cooking method of the present disclosure.

There are several optional systems, components or procedures that may be utilized in conjunction with the sous-vide system 10, shown in FIGS. 6 and 7. One such option, shown in FIG. 2, is to use a pre-heater located upstream of the chamber 40 to sear or brown or otherwise condition the exterior of the food product prior to sous-vide cooking. As shown in FIG. 3, a marinating system 150 is provided to marinate the food products prior to vacuum sealing in pouch or container 220 and either before or after surface conditioning of the food product. FIG. 4 shows a packaging station 200 wherein the food product FP is vacuum sealed in packages 220 prior to sous-vide cooking in the chamber 40.

Further, a control system 250 is employed to control the operation of the sous-vide system 10 so that the food product is cooked to the desired level at the desired rate so as to achieve the advantages of sous-vide cooking, while at the same time killing a desired percentage of any pathogenic microorganisms that may be present on the surface and/or in the interior of the food product FP. The control system 250 receives input from various measurement devices or instruments of a measuring system 252 that measures/monitors among other parameters the temperature and moisture level within the chamber 40, the temperature of the food product FP entering the chamber 40, the speed of the conveyor system 20, the level of loading of the food pouches 220 on the conveyor system, as well as the flow rate of the cooking medium circulating through the chamber 40, as discussed more fully below.

Describing aspects of the present disclosure in more detail, prior to sous-vide cooking, it is desirable to properly prepare the food products, typically meat, poultry, fish, and other protein foods, for sous-vide cooking. In this regard, it is helpful if the food portions are of substantially the same thickness since in cooking, a substantial length of time can be required for heat to travel to the interior of a food product, including meat, and sufficiently heat the interior to an adequately high temperature to both cook the food product and kill any pathogens. It is envisioned that using the present commercial scale sous-vide cooking method, food products, such as meat, can be of a thickness of up to about two inches and more typically about one and one-half inches and be successfully cooked via sous-vide method. Of course, the food portions can be of a thinner thickness, as long as the thicknesses of the portions are substantially the same. The desired thickness of the portions can be achieved by precisely cutting portions from larger pieces of the food product using, for example, a cutting knife or water jet cutter, FIG. 6. Another alternative is to use a flattener to flatten the food product to a desired thickness, FIG. 7. Food flatteners are articles of commerce. After flattening, the food product is typically thermally treated so that the meat or other food product does not return to its original thickness. The thermal treatment can be carried out in numerous ways, such as using a belt grill.

Once the food product has been cut, flattened and then heat-treated or otherwise processed to a desired thickness, the exterior surface of the food product may be processed. For example, a pre-heater 100, shown in FIG. 2, can be used to heat or sear the exterior of the food product to achieve among other results, a desired exterior color or appearance. The pre-heater 100 may include an upper heater energy source 102 positioned above the upper run of a conveyor 104 carrying the food products FP through housing 122 to apply intense surface heat to the top side of the food product FP. A lower heat source 108 is positioned below the conveyor belt to apply intense surface heat to the underside of the food product. The surface heating or conditioning of the food product can be in the form of a very high temperature, typically in the range of 1200° to 1800° F. using infrared radiation, but can be as high as 3000° F. if a tungsten wire and a quartz tube is utilized as the heat source. Other radiant, refractive, or convective heat source of at least 500° F. can be used, as well as searing the exterior surface of the food product with a belt searing system at a temperature of at least 1000° F.

The surface heating of the food product can achieve a desired color for the food product. If the food product is meat, the desired color may be a brown color or a dark brown color providing an appealing color to the food product.

In terms of flavor, it is known that for meat products, heat has an effect on flavor. Although the flavor of cooked meat is affected by water-soluble components, typically the volatile components of the meat formed during cooking processes the aroma that contributes to the characteristic flavors of meat. The heating of the meat increases the concentration of aliphatic andehydes, benzenoides, polysulphides, heterocyclic compounds, and lipid-deride volatiles. These compounds and volatiles contribute to the flavor of meat. See "The Chemistry of Beef Flavor, Executive Summary," 2007 Cattlemen's Beef Board, National Cattlemen's Beef Association, Centennial, Colorado. This publication is incorporated herein by reference.

In addition to enhancing or improving the cosmetic appearance of a food product by browning or otherwise darkening the surface of the food product, another benefit of pre-heating is that pathogens on the surface of the food product may be eliminated prior to the sous-vide cooking process. As such, only the pathogens in the interior of the food product need to be killed during the sous-vide cooking.

In this regard, if the surface temperature of the food product can be raised to at least 160° F., aerobic vegetative pathogenic bacterial cells on the food surface can be eliminated.

As noted above, infrared radiation and a tungsten wire in a quartz tube have been identified as heat sources. However, various other thermal energy sources may be utilized in the heater 100, including radio frequency radiation. Also, a belt grill system may be used.

The temperature within the heater 100 is monitored by a temperature gauge 110 which is connected to a control system 250, which control system is capable of controlling the operation of the heater 100.

FIG. 3 schematically depicts a marinating/brining system 150 that can be used to automatically inject a marinade, a brine, or other liquid(s) into the food product FP while being transported either along conveyor system 20 or on a belt 152 of a separate conveyor system. The marinating system 150 is schematically illustrated as utilizing a series of injection needles 154 that may be plunged downwardly by or from an overhead mounting/or control system 156 positioned above the conveyor belt 152. The needles 154 are capable of quickly injecting marinade into the food product FP.

The marinade or brine can be of various compositions, for example, a solution of water, sugar, salt, and/or phosphates and other ingredients, to flavor and help maintain the moistness of the food product during sous-vide cooking. Other marinating/brining solutions may include, for example, fruit juices, cooking oils, dissolved flavorings and spices.

Another type of marinade or brine can be of a high viscosity nature that is created by blending the macerated trim from the food product with a marinade or brine solution and then injecting this into the food product. As noted above, marinating/brining can result in increased moistness of the food product, enhanced flavoring of the food product, reducing moisture leaving the food product during sous-vide cooking, and also a breaking down of tougher muscle components in the food product. It is noted that the product trim is typically a lower cost material than the food product remaining after trimming. As such, more of the food product itself can be utilized in the overall cooking process at an economical cost.

It will be appreciated that composition and quantity of marinade/brine used can be used to control at least to some extent the amount of moisture lost from the food product during sous-vide cooking. Thus, it is possible to achieve a substantially uniform final weight of the food product after sous-vide cooking, regardless if the food product is cooked to a rare, medium rare, done or well done state. To this end, the brine formulation can include macerated trim, starches and/or carageenan or other combinations of similar ingredients.

Further, rather than marinating or brining the food product by injection, the food product may be passed through an immersion bath containing the desired marinating/brining solution. Such immersion baths may be used in lieu of or in addition to injecting the marinade/brine into the interior of the food product using the system shown in FIG. 3, or other system. Further, the marinade or brine may be sprayed, brushed or otherwise applied using a batter-type applicator to the exterior of the food product prior to being vacuum packed. The marinade/brine may also be applied to the food product using a vacuum tumbler.

Next, referring to FIG. 4, a packaging system 200 is schematically illustrated. The packaging system 200 would be located upstream from the sous-vide cooking chamber 40 but downstream from heater 100 and marinating system 150. As shown in FIG. 4, the food product FP is sealed within food grade sterile pouches or plastic packages 220. These packages can be formed from a lower sheet 202 that overlies conveyor belt 22, and by overlying the lower sheet with an upper sheet of thermal plastic film 204. The pocket or pouch or container 220 can be formed by applying a vacuum to the lower sheet thereby drawing the lower sheet and the food product thereon into a tray or mold, not shown, as the food product moves on the conveyor belt 22 in the direction of arrow 206. The pockets formed in the lower sheet 202 conform to the size and shape of the food product. After the food products have been placed in the pockets formed in the lower sheet, the upper sheet of thermal plastic film 204 is placed over the lower sheet. The upper sheet is fed from a supply roll 208, downwardly over the top of the lower sheet, and then sealed against the lower sheet with a vacuum and heat seal system to form sterile sealed pouches or containers 220. Prior to applying the upper sheet 204, a brine, marinade, spices, etc., may be applied to the food product. For example, such brines, marinades, spices, etc., can be placed in the pocket formed in the lower sheet 202 during the vacuum forming process.

The individual pouches or containers 220 can be cut from the films 202 and 204 along cutting lines 210 and 212 to form the individual pouches or containers 220.

The food-grade thermal plastic sheets 202 and 204 are well known articles of commerce. Such sheets can be composed of polyethylene or other food-grade thermal plastic material.

In addition, the packaging or "bagging" of the food product can occur by numerous other ways in addition to that shown in FIG. 4. For example, preformed plastic containers or bags can be utilized and the food product placed within the bags along with a brine, marinade, spices, seasonings, etc. Thereafter, the bag can be vacuum sealed to eliminate any entrapped air, thereby leading to a more efficient heat transfer between the sous-vide heating medium and the food product.

Next, describing the sous-vide system 10 in greater detail, the conveyor system 20 includes a conveyor belt 22 for carrying the food product FP contained in the pouches or package 220 through the sous-vide chamber 40. The conveyor belt 22 receives food product FP pouches from a delivery or loading conveyor 24 and then transports the food product into the sous-vide chamber 40, and then in one embodiment of the present disclosure, along an ascending and then descending spiral path within the chamber 40 to form an ascending belt stack 26 and then a descending belt stack 28. This path enables the food product to be processed in sous-vide in the chamber 40 within a relatively compact envelope. The conveyor belt 22 then carries the processed food product FP from the chamber 40 to a chiller or freezer, not shown, to cool and perhaps also freeze the food product prior to transporting the food product for shipment, storage, or otherwise.

In order to perform the function of the conveyor system 20 in a satisfactory manner, it is desirable that conveyor belt 22 be of an open or pervious configuration, such as composed of stainless steel wire mesh, thereby to provide adequate exposure to the underside of the food product. Such conveyor belts are articles of commerce.

The conveyor belt 22 is driven by an appropriate motor system, such as motor 30. The speed of the motor 30 and, thus, the belt 22 may be monitored by an encoder 32 associated with the motor and/or belt. A data signal from the encoder 32 is routed to control system 250. The operation in the control system is discussed more fully below.

Although the conveyor belt 22 can be of numerous configurations, in one form, the belt can be adapted to be self-supporting to form the belt stacks 26 and 28. Such self-supporting belts are known in the art, for example, as shown in U.S. Pat. No. 7,374,035, the disclosure of which is incorporated herein by reference.

Referring primarily to FIG. 1, the sous-vide chamber 40 includes an insulated housing 42 that can be of various constructions and shapes, for example, the housing 42 can be generally rectilinear or generally cylindrical in shape to accommodate the belt stacks 26 and 28, as well as the other components of system 10 located within the housing. The housing includes an inlet 44 located at the lower portion thereof through which the conveyor belt 22 enters the housing, and an outlet 46 also in the lower portion of the housing through which the conveyor belt 22 exits the housing. The elevation of the inlet 44 and outlet 46 can be of the same elevation in the housing 42.

An appropriate sealing mechanism can be utilized to retain the housing 42 sealed from the exterior. Such sealing mechanisms may include, for example, an air knife 48 or steam knife adjacent housing inlet 44, as well as a second air knife 50 adjacent housing outlet 46. Of course, other types of sealing mechanisms may be utilized, for example, a curtain of flexible strips, constructed of a film material such as plastic or fabric coated with Teflon®, that hangs downwardly over the inlet 44 and outlet 46, and that are sufficiently flexible to conform to the shapes of the food products FP being carried by the conveyor. Of course, the plastic strip curtain construction may require periodic cleaning to help ensure that undesirable microorganisms do not lodge on the plastic or fabric hanging strips.

As noted above, belt stacks 26 and 28 are located within the interior of housing 42, with the conveyor traveling in an ascending helical path entering the bottom of housing 42 through entrance 44 and then in a descending helical path before exiting the housing at a lower portion of the housing 40 through outlet 46 at substantially the same elevation as entrance 44. Although two belt stacks 26 and 28 are shown as positioned within the housing 42, the housing can be adapted to contain other numbers of belt stacks. Moreover, the conveyor belt 22 may be disposed in a different arrangement other than the helical belt stacks 26 and 28 shown in FIG. 3. For example, an elevating chain conveyor may be employed as disclosed in U.S. Pat. Nos. 3,653,490, 4,627,530, and GB Patent No. 1038955, all incorporated herein by reference.

The sous-vide cooking medium is comprised of saturated steam supplied to the chamber 40 to cook under ideal sous-vide cooking conditions to a desired level, which includes a level that is sufficient to kill pathogens, such as *E. coli* on and/or in the food product. In this manner, the food product is sufficiently cooked to be ready to eat, regardless of the extent of subsequent heating that occurs at a restaurant, home, or other location. In this regard, the cooking medium is supplied to the chamber 40 so that the temperature within the chamber is in a range of about 150° F. to 200° F., which is above the temperature needed to kill bacteria, typically 125.6° F. At this temperature range, pasteurization of the food product can be completed within a commercially reasonable length of time. The actual time required will depend on numerous factors, such as the type of food product, the thickness of the food product, the initial temperature of the food product, the temperature of the cooking medium, the desired kill level of pathogens, etc.

The steam may be from various sources, for example, from steam generators 60. The steam can be introduced into the sous-vide chamber by steam inlet lines 62 connected through flow valves 66, a pressure regulator 68 and ending at one or more discharge nozzle(s) 70. The discharge nozzles 70 are shown as positioned below the stacks 26 and 28. Since steam is lighter than air, introducing the steam below the stacks 26 and 28 will help ensure that the chamber 40 is filled with steam.

It will be appreciated that at a temperature below 212° F., the saturated steam in the chamber 40 will be less than 100% steam vapor. Instead, the cooking medium will consist in part of air. As the temperature of the saturated steam lowers below 212° F., the vapor portion becomes non-linearly lower and the air component of the mixture becomes non-linearly higher. For example, at 150° F., saturated steam will consist of 25% moisture by volume and have a specific humidity of 0.172. Advantageously to sous-vide cooking, this lower moisture content by volume significantly lowers the condensing heat transfer capability of the cooking medium. As such, slower cooking of the food product can occur with correspondingly increased dwell time of the food product in the chamber 40. The rate of cooking can be controlled by the temperature of the cooking medium, which, as described above, for saturated steam is a function of the moisture content of the saturated steam.

In addition to the temperature of the cooking medium, the dwell or cooking time of the food product can also be affected by the flow rate of the cooking medium through the chamber 40. The cooking medium may be routed through the chamber 40 in a variety of different paths. FIG. 1 shows one possible flow path 80 of the cooking medium relative to the ascending and descending spiral paths 26 and 28 of the conveyor 20. In the ascending spiral 26, the cooking medium is routed in a counter-clockwise direction flowing downwardly along the outside of the annular path shown in FIG. 1 and flowing upwardly along the inside of the annular path. The flow pattern of the cooking medium for the descending spiral path 28 of the conveyor is in the opposite, clockwise direction. In this regard, the flow path is downward along the exterior of the spiral path and upward along the interior of the spiral path. Of course, the flow patterns can be reversed from that shown in FIG. 1.

In addition, the cooking medium can be directed to flow at least partially laterally relative to the spiral conveyor paths 26 and 28. Further, the spiral stacks 26 and 28 can be divided into an upper and lower region by, for example, a movable or fixed mezzanine or baffle system. As such, the flow pattern of the cooking medium may be different in the upper portion of the spiral stacks 26 and 28 relative to the lower portion of the spiral stacks.

Various methodologies and systems for controlling and changing the direction and speed of processing medium flow through spiral ovens are disclosed in co-pending U.S. patent application Ser. No. 15/418,519, as well as in U.S. Pat. No. 8,753,703, U.S. Patent Publication No. 2013/0133637, all of which are incorporated herein by reference.

Air can be introduced into the chamber 40 via inlet duct 240 connected to an air pump 242. The air pump is connected to the control system 250 that can control the temperature within the chamber 40 by changing the relative moisture of the cooking medium, as discussed above.

As noted above, the sous-vide system 10 includes a monitoring system 252 that monitors or measures the operational parameters of the pasteurization system 10. Such monitoring or measuring includes the loading frequency or density of the food product loaded onto the conveyor 20 from the delivery conveyor 24. Such loading monitor or sensor is schematically symbolized by the loading monitor/sensor 254 shown in FIG. 1. The loading monitor/sensor can take various forms, including a scale to weigh the food product being transferred to conveyor 20. Alternatively, the loading monitor can be in the form of an optical scanner capable of scanning the food product and determining the volume of the food product, then calculating the weight of the food product by using the known density of the food product. Such scanning systems are well known in the art. For example, see U.S. Pat. No. 7,452,266. The disclosure of this patent is incorporated herein by reference. The information from the load monitor 254 is transmitted to the control system 250.

The monitoring system 252 also measures the temperature and moisture level within the heating chamber 40 as well as the velocity of the air flowing through the sous-vide chamber. These operational parameters are monitored by temperature sensors 256, 262, moisture sensors 258 and 264, and flow velocity sensors 260 and 266 as shown in FIG. 1. These sensors are connected to the control system 250. The temperature sensor 256 and 262 can be configured to sense the dry bulb and wet bulb temperatures within the sous-vide chamber 40. The reason for also measuring the wet bulb temperature is that as the pouches 220 are introduced in the sous-vide chamber 40 and carried through the chamber, the pouches are initially heated by condensation. However, as their surface temperature gradually increases, eventually this surface temperature will reach the dew point temperature of the moist, hot air in the chamber 40. At that point, the moisture in the cooking medium within the chamber 40 will not condense on the surface of the pouch. Instead, the moisture on the surface of the pouch will begin to evaporate, which tends to cool the pouch surface somewhat. The temperature at which this transition occurs will be the wet bulb temperature (dew point temperature). Nonetheless, the temperature of the food product within must still be sufficient to carry out sous-vide cooking and also kill the desired level of pathogens on and/or in the food product. As an alternative, the monitoring system can measure the dry bulb temperature and humidity level in the cooking chamber 40. From this information it is possible to determine the wet bulb temperature, relative humidity, and dew point within the chamber 40.

It will be appreciated that sous-vide cooking process can be designed so that the temperature of the pouches 220 can be reduced below the dew point temperature within the chamber 40, so that heating can again occur by heat of condensation. This can increase the efficiency of the heating process. Further, this process can be repeated at least several times during the progress of the food product FP through the chamber 40.

The monitoring system 252 can utilize temperature sensors embedded in the food product to continuously measure the temperature of the food product when within the sous-vide chamber 40. As discussed below, this could simplify or perhaps even eliminate modeling of heat transfer, but of course modeling of the lethality of pathogens occurring in the sous-vide chamber 40 would still be required. Also, the results of the modeling of the lethality of the pathogens can be correlated back to the surface temperature of the food product, which could be monitored by equipment to measure the external temperature of the food product, such as by infrared sensors.

The monitoring/measuring system 252 can be configured to also measure the initial temperature of the food product, such as by use of a temperature sensor 268 located downstream of the loading conveyor 24. Temperature sensor 268 can be an infrared sensor or may be of another type. Also, the temperature of the food product FP may be sensed at other locations along the pasteurization system.

As noted above, sous-vide system 10 includes a control system 250 to help insure that the food product is properly cooked via sous-vide to a desired level, including sufficiently pasteurized to kill a desired percentage of the pathogenic microorganisms present on and/or in the food product. To this end, the various sensors and measurement devices and instrumentation discussed above are connected to the control system 250 by hard wiring, radio frequency, Bluetooth®, or other wireless transmission means, or otherwise so that the control system is aware of the loading level of food product on the conveyor 20, the speed of the conveyor 20, the temperature and moisture within the sous-vide chamber 40, as well as the direction and velocity of the cooking medium circulating through the chamber 40. The control system 250 monitors these operational parameters of the system 10 to determine if such operational parameters are within the set points that have been predetermined for these operational parameters. When the operational parameters are within the set points, it has been predetermined that the sous-vide processing of the food product by system 10 is operating properly and that a desired percentage of pathogenic microorganisms present on and/or in the food product in question will be killed.

The control system 250 includes a processor 300 for use in controlling the sous-vide system 10. The control system also includes a suitable controller 302, such as a programmable logic controller 302 linked to the processor and having an appropriate interface 304 for connecting the various gauges, monitors, and components of the pasteurization system to the logic controller 302. Memory unit 306 is provided for storing information regarding the pasteurization system, and a keyboard or other input device 308 is provided to enable the operator to communicate with the processor and logic controller. Also, a display or other output device 310 is provided to convey information from the processor or control system to the operator, including the functioning of the pasteurization system 10. An example of a processor-operated control system for controlling a pasteurization apparatus is disclosed by U.S. Pat. No. 6,410,066 and U.S. Patent Publication No. 2015/0010679, both of which are incorporated herein by reference.

The control system, more specifically the computer together with the controller 302, controls the various components and subsystems of the sous-vide system 10, including the level of the loading of the food product onto the conveyor, by controlling the operation of the loading conveyor 24. The control system also controls the speed of the conveyor belt 22 by controlling the conveyor drive motor 30. In addition, the control system controls the temperature within the chamber 40 by controlling the temperature, moisture content, and speed of the cooking medium circulated through the sous-vide chamber 40. In addition, the control system controls the operation of the pre-heater 100. The control system also monitors the loading sensor 254, the moisture sensors 258 and 264, the circulation or velocity sensors 260 and 266, as well as the various temperature sensors 256, 262, and 268. Thus, the control system is capable of controlling the sous-vide system 10 and the pasteurization process performed by the system 10 to provide a desired sous-vide cooking environment as well as achieve a targeted reduction in the pathogenic microorganisms present on and/or in the food product FP.

In the control system 250, the computer 300 may operate under a process control program to control the sous-vide process in accordance with, for example, the specific temperature and humidity profile within the chamber 40 which was determined empirically to achieve a desired sous-vide cooking process and also result in a desired microbial kill rate within a fixed period of time for a specific food product of a known thickness/species. The process control program may be designed to predict the temperature of the food product as it changes over time and applies a time/temperature model. This model is not just the kill rate of the bacteria, but also a prediction of the temperature of the food. The models used will have been validated and confirmed to meet applicable food health and safety regulations, for example, the FDA's Hazard Analysis and Critical Control Points (HACCP) plans and principles, as well as USDA regulations. See Appendix A, included below at page 22. Of course, the validated model used herein will have to be specific to: the type of food product; the thickness range of the food product; the initial temperature of the food product; in some instances, the fat content of the food product; the moisture content of the food product; the temperature of the cooking medium and/or the cooking chamber; the moisture level of the cooking medium and/or cooking chamber; the loading level of the food product on the conveyance system; etc. Also, the validation modes will have to include assumptions about the food product, for example, heat transfer coefficients, mass transfer out of the food product, and weight of the food as pasteurized, etc. Due to the inherent variability of food products, the temperature prediction will have a certain range, and a conservative approach will have to be taken, for example, a sufficiently long cooking time or a sufficiently high cooking temperature to compensate for the uncertainty. The approach may include a statistic analysis to determine pathogen kill based on the food product variables noted above, including, for example, thickness of the food product, fat content, and other composition of the food product, the initial temperature of the food product. As a consequence, some individual food products will require a longer sous-vide cooking time and/or pasteurizing time than other specific food products. The statistic approach can be taken to determine the desired cooking time and/or pathogen kill of the least heated food product. In no instance shall residence time fall short of Appendix A.

In addition, the control system may operate under a process deviation program that includes a real-time mathematical model that calculates the time and temperature required to achieve a desired cooking level and/or pathogen kill rate and undertakes process parameter changes if, for example, the temperature and/or humidity of the cooking fluid within the sous-vide chamber 40 deviates sufficiently from the set point range(s). The control program may utilize one or more proportional-integral-derivative (PID) controller algorithms which function to adjust one or more of the system parameters to seek to enable the system to still achieve a desired cooking level and/or microbial kill rate, even if one or more of the operational parameters of the cooking system are beyond their preselected set point(s). For example, if the monitoring system 252 indicates that the temperature within the sous-vide chamber 40 deviates too far from the set point, the control system 250 can not only seek to bring the temperature of the sous-vide chamber back to within the desired set point, but also could immediately decrease the speed of the conveyor 20 so that the food product dwell time in the chamber 40 is increased.

Moreover, if the control system 250 determines that the food product leaving the sous-vide chamber 40 has not been sufficiently cooked and/or properly pasteurized, the control system could automatically activate a diverter system, not shown, to divert the affected food products from the conveyance system 20 so that such food products can be reprocessed to achieve the desired cooking level and/or microbial kill rate or used for another purpose.

Rather than automatically adjusting the operational parameters of the pasteurization system 10, the control system 250 may instead alert the operators to the deviation of the affected process parameter from the preset set point. The control system can, in addition, suggest adjustments to be made to the process parameters and/or operational settings of the components of the pasteurization system. Thereupon, the operator can make the indicated adjustments.

The control system 250 also may include a program that records the ongoing sous-vide system for future review and reference. Such a recordation program, as well as process control programs and process deviation programs, are disclosed in U.S. Pat. No. 6,410,066, incorporated herein by reference.

A process control program under which the controller system 250 operates may be designed to start the sous-vide system 10 as well as thereafter control the sous-vide system in order to maintain the process parameters at or near their predefined set points during the operation of the system 10. When starting the sous-vide system 10, the user can prompt the control system, whereupon the control system will activate the conveyance system 20 so that the conveyor belt 22 operates at its predefined speed. The control system will also activate one or more hot air pumps (not shown) to raise the temperature in the sous-vide chamber 40 to its predesigned set point. In this regard, an air heater may be associated with air pump 242. When the temperature within the sous-vide chamber reaches the selected set point, as determined by the temperature sensors 256 and 262, the control system can activate the steam generators 60 used to supply steam to the sous-vide chamber via steam inlet lines 62 thereby to increase the moisture level of the sous-vide medium within the sous-vide chamber. When the moisture level within the sous-vide chamber reaches the set point as determined by the humidity sensors 258 and 264, the computer can activate the infeed conveyor 24 in order to begin sous-vide cooking of food products.

The control system may prompt the operator to enter the type and initial temperature of the food product to be processed and also request other information concerning the food product, as listed above. Alternatively, the control system may simply measure the initial temperature of the food product using temperature sensor 268. As the sous-vide process proceeds, the control system will monitor the process conditions of the sous-vide system 10, and if necessary, adjust the various components of the sous-vide system, such as the loading level of the food product onto the conveyor 20, the speed of the conveyor 20, the moisture level and temperature within the chamber 40, in order to maintain the process conditions within the preselected set point ranges.

Figure 5:
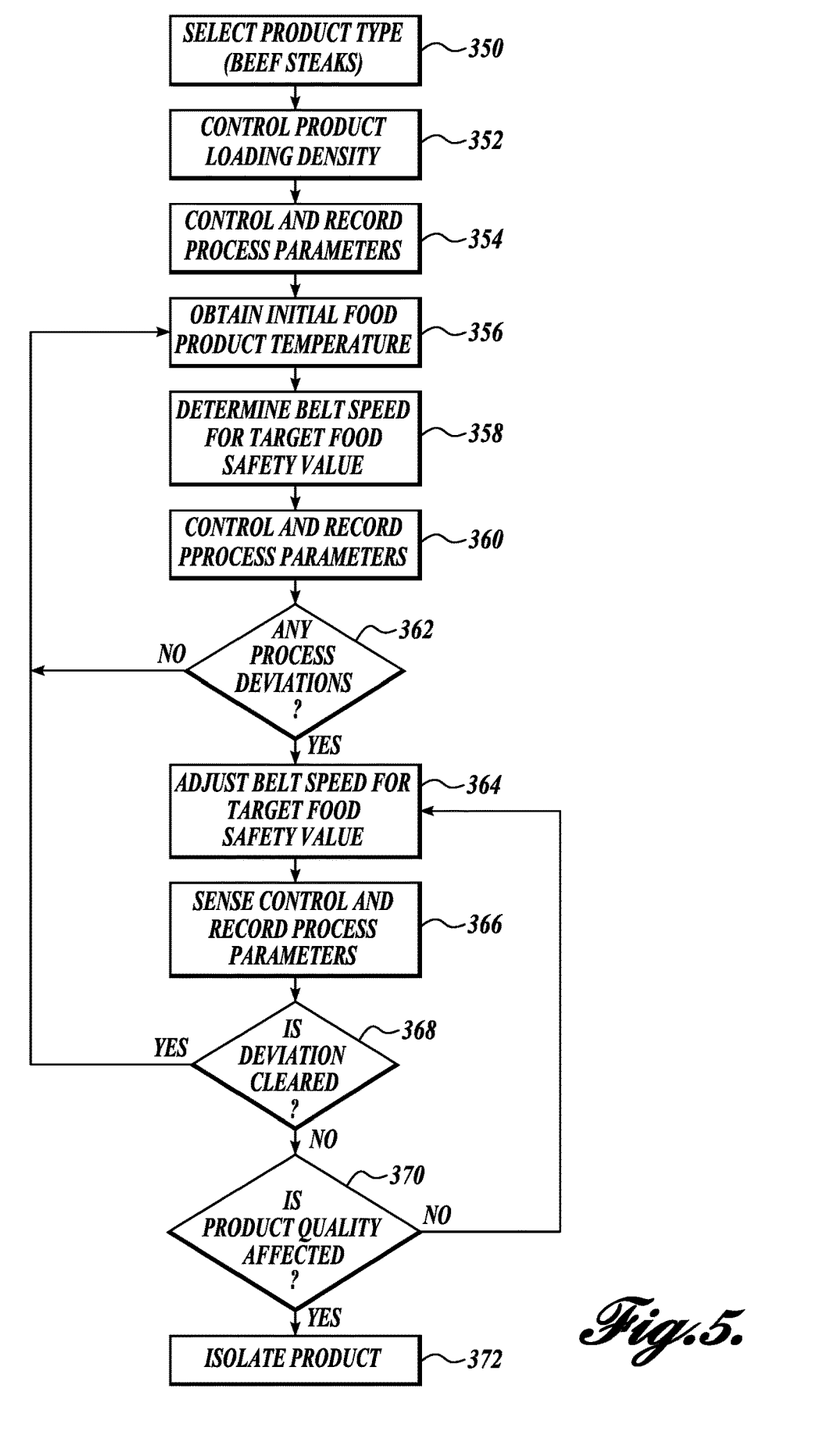
FIG. 5 is a first flow diagram of a cooking method of the present disclosure employing sous-vide cooking.

FIG. 5 demonstrates a control program that may be operated by control system 250 to control the pasteurization system 10. In essence, the control program depicted in FIG. 5 combines a process control program as described with a process deviation program that adjusts certain components of the sous-vide system 10 when the control system 250 detects certain deviations between the process conditions or parameters and their set point values.

As shown in FIG. 5, the operator of system 10 first selects the type and size (e.g., thickness) of food product that will be pasteurized, such as, for example, beef steaks at a thickness of one and one-half inches (step 350). Based on this particular food product, the control system operates the infeed conveyor 24 to affect the desired loading of the beef steaks on the conveyor belt 22 (step 352). In addition, the control system activates certain of the other components of sous-vide system 10, including the steam supply system 60 and the circulating speed of the cooking fluid within the chamber 40, thereby to achieve the predetermined process conditions within the chamber 40 (step 354). As part of this step, the operation and control of the process parameters is recorded.

The control system then obtains the initial temperature of the beef steaks, either from the operator or from direct measurement using temperature sensor 268 (step 356). Using well known pasteurization equations, the control system calculates the conveyor speed which is needed to achieve a desired cooking level as well as a target microbial kill rate, for example, a 5-log reduction in the pathogenic organisms that may be on and/or in the food product (step 358). If required, the control system adjusts the belt speed, senses the process conditions in the chamber 40, and adjusts the components of the sous-vide system to be consistent with their set points. As noted above, these components could include the steam supply system 60, the air supply via duct 240, and the flow rate of the cooking medium within the chamber 40.

In step 362, the control system compares certain of the process conditions determined in step 360, such as the temperature and moisture level of the air within the chamber 40, with the corresponding set point values and determines if a deviation exists in these values. If no deviation exists or if the deviation is within preselected limits, the control system will continue to operate the system 10 in the normal fashion by cycling back to step 354. However, if a deviation exists that extends beyond a preselected limit, the control system will adjust the speed of the conveyor belt 22 in a predetermined fashion in an attempt to achieve a desired level of cooking and/or the target microbial kill rate (step 364). The control system will thereafter sense the process conditions at step 366 and compare the sensed values to their predetermined set points to determine if the deviation has been cleared (step 368). If the deviation has been cleared, the computer will continue to operate the pasteurization system 10 in a normal fashion by cycling back to step 356.

If the deviation has not been cleared, either the operator or the control system will decide whether the quality of the beef steaks has been adversely affected, for example, that the desired microbial kill rate achieved is not within acceptable standards (step 370). If the quality of the beef steaks has been sufficiently adversely affected, the beef steaks will be isolated (step 372). If, however, the quality of the beef steaks has not been affected, the control system will return to step 364 and once again adjust the speed of conveyor 20 in a predetermined fashion in an attempt to achieve the target (desired) microbial kill rate.

Although specific embodiments of the present disclosure have been described above, such embodiments are not intended to be exhaustive nor is the present disclosure to be limited to the specific embodiments described. The present invention can take other forms. For example, rather than utilizing a control system 250 that automatically seeks to adjust process parameters in order to attain a desired level of cooking or a desired microbial kill level by utilizing the process deviation program that includes a real-time mathematical model that calculates the time and temperature required to achieve a desired cooking level and/or a desired kill rate, alternative or simpler processes may be utilized. For example, it is possible to utilize simplified formulas or look-up tables that will provide the microbial kill rate depending on the deviation of the process parameter in question, for example, the temperature within the sous-vide chamber. The look-up table could specify the dwell time needed within the sous-vide chamber for an acceptable kill rate to be achieved at specific temperatures within the sous-vide chamber. Use of one or more simplified formulas or look-up tables may be especially useful if the control system is of the type that provides notices of process deviations to the operator and then requires the operator to determine what corrective action, if any, is needed.

Another simplified approach is to simply increase the dwell time of the food product in the chamber 40 to account for variations in the temperature of the food product entering the chamber 40 and the temperature and humidity within the chamber. For example, if based on the temperature of the food product entering the sous-vide chamber and/or the temperature and/or humidity within the sous-vide chamber the ideal dwell time is 40 minutes, then the dwell time within the sous-vide chamber might be increased to 50 minutes to accommodate tolerances in the initial temperature of the food product as well as the temperature and/or humidity within the sous-vide chamber. In this regard, dwell time has less impact on food product quality than if instead the temperature within the sous-vide chamber were to be increased significantly. On the other hand, an increased dwell time within the sous-vide chamber does have a negative effect on food product quality and/or throughput, so it is desirable to not increase dwell time beyond that necessary to ensure product safety.

Another approach is to measure the temperature of the food product continuously, or relatively continuously, during pasteurizing, and that temperature is used in the time/temperature lethality calculation. An actual model may not be needed to be used to predict temperature of the food product, although the temperature has to be representative of the worst case in the oven at any given time. In this approach, it would not necessarily be practical to continuously measure the temperature of each food product. Rather, the temperature of selective food products would be continuously measured using a temperature sensor/wireless transmitter placed within the interior of the food product (at or near the interior center) before vacuum sealing with the sous-vide bag/container. In this manner, the temperature of the food product can be constantly logged. The number of food products actually measured for temperature could be selected on a statistical basis so that a desired confidence level is achieved regarding the accuracy of the measured temperature of the food product.

As another variation or aspect of the present disclosure, the chamber 40 can be divided into two or more temperature and humidity zones. For example, the chamber may be maintained at a higher temperature as well as perhaps a higher humidity toward the bottom of the stacks 26 and 28. This can be achieved, for example, by introducing a higher volume of steam in the lower portion of the stacks 26 and 28. Separate steam inlets may be positioned in the lower portions of the stacks 26 and 28 relative to the upper portions of the stacks. Further, in order to help physically separate the stacks 26 and 28 into different temperature and/or humidity zones, a partition 340 may extend inwardly from the walls of the housing 42 and a center portion 342 provided at least partial physical separation between the upper and lower portion of the stacks 26 and 28. Applying higher temperature and/or humidity in the lower portion of stack 26 has the advantage of more quickly warming up the food product to a temperature that is above the killing temperature of pathogenic microorganisms; in other words, above 125.6° F.

As a further aspect to the present disclosure, the sous-vide system 10 can be operated to achieve various desired degrees of cooking of the food product. As such, the warming of the sous-vide product for eating may be essentially the same for any desired "degree of doneness," such as medium rare, medium, medium well, or well done. Process parameters can be calculated/developed so that the required amount of heating of the food product can be essentially the same using the system 10 of the present disclosure. The parameters such as the temperature within the sous-vide chamber 40 as well as the speed of the conveyor belt 22 may be adjusted to achieve the desired level of cooking of the food product. For example, to achieve a medium rare level of cooked food product consisting of beef steaks, the temperature within the chamber may be from about 135° F. to about 140° F. To achieve cooking of the beef steaks to a medium done condition, the temperature within the chamber 40 may be from about 140° F. to about 145° F. Correspondingly, to achieve a medium well-cooked condition of the beef steaks, the temperature within the sous-vide chamber may be from about 145° F. to about 150° F. Further, to achieve cooking of the beef steaks to a well-done condition, the temperature within the sous-vide chamber may be from about 150° F. to about 160° F. Cooking under these last conditions will achieve a "well done" color of the beef steaks as well as a high level of food safety.

Various desirable/acceptable cooking temperatures are set forth above. As noted, these temperatures specifically pertain to the cooking/pasteurization of beef steaks. Of course, if other types of meat, such as lamb, pork, chicken, turkey, fish and/or other types of food products are being processed, the pasteurizing temperatures set forth herein may need to be adjusted accordingly.

While illustrative embodiments have been illustrated and described, it will be appreciated that various changes can be made therein without departing from the spirit and scope of the invention.

Appendix A

Draft Compliance Guidelines for Ready-to-Eat Meat and Poultry Products

On Feb. 27, 2001, FSIS published a proposed rule "Performance Standards for the Production of Processed Meat and Poultry Products" (66 FR 12590). The proposed regulations include lethality and stabilization performance standards, *Listeria* testing requirements, and the rescission of requirements regarding trichina in pork products. To assist establishments in understanding these requirements, FSIS is issuing draft compliance guidelines. FSIS requests comment on these guidelines. These guidelines are based on previous Agency regulations, published scientific, challenge studies and other procedures validated to achieve the performance standards. Covered RTE products include cooked, fermented, salt-cured and dried meat and poultry products.

Except for thermally-processed, commercially-sterile products, the performance standards for lethality for all ready-to-eat (RTE) products require a 6.5 $\log_{10}$ reduction of *Salmonella* throughout finished meat products and a 7.0 $\log_{10}$ reduction of *Salmonella* throughout finished products that contain poultry. In addition, RTE fermented products that contain beef are required to have 5 $\log_{10}$ reduction of *E. coli* 0157:H7 throughout. Except for thermally-processed, commercially-sterile products, the performance standards for stabilization require no growth of *Clostridium botulinum* and no more than 1 $\log_{10}$ growth *Clostridium perfringens* throughout all RTE meat and poultry products.

Compliance Guidelines for Meeting Lethality Performance Standards for Cooked Ready-to-Eat Meat and Poultry Products With the 1999 final rule, "Performance Standards for the Production of Certain Meat and Poultry Products" (, 64 FR 732), applicable to cooked beef, roast beef, chunked and formed roasts, corned beef and poultry products, the Agency included compliance guidelines for lethality (Appendix A of the final rule). These compliance guidelines include times and temperatures to achieve a 6.5 $\log_{10}$ and 7.0 $\log_{10}$ reduction of *Salmonella* in meat products. For poultry products, an endpoint temperature for cooking to achieve a 7.0 $\log_{10}$ reduction of *Salmonella* is recommended. These same compliance tables could be used for all cooked RTE meat, including RTE cooked meat patties, because the proposed lethality performance standards are the same as those already in place for other RTE products.

Similarly, the compliance guidelines for stabilization performance standards found in Appendix B of the final rule, could also be used for compliance with the proposed RTE rule. These compliance guidelines will achieve the requirement of no growth of *Clostridium botulinum* and no more than 1 $\log_{10}$ growth *Clostridium perfringens*. The compliance guidelines in Appendix A and Appendix B of that rule are reproduced here.

Guidelines for Cooked Meat Products

1. Cooked beef, pork, lamb and other meat products can be prepared using one of the following time and temperature combinations to meet either a 6.5-$\log_{10}$ or 7-$\log_{10}$ reduction of *Salmonella*. The stated temperature is the minimum that must be achieved and maintained in all parts of each piece of meat for a least the stated time:

| Minimum Internal Temperature | | Minimum processing time in minutes or seconds after minimum temperature is reached | |
|---|---|---|---|
| Degrees Fahrenheit | Degrees Centigrade | 6.5-$\log_{10}$ Lethality | 7-$\log_{10}$ Lethality |
| 130 | 54.4 | 112 min. | 121 min. |
| 131 | 55.0 | 89 min. | 97 min. |
| 132 | 55.6 | 71 min. | 77 min. |
| 133 | 56.1 | 56 min. | 62 min. |
| 134 | 56.7 | 45 min. | 47 min. |
| 135 | 57.2 | 36 min. | 37 min. |
| 136 | 57.8 | 28 min. | 32 min. |
| 137 | 58.4 | 23 min. | 24 min. |
| 138 | 58.9 | 18 min. | 19 min. |
| 139 | 59.5 | 15 min. | 15 min. |
| 140 | 60.0 | 12 min. | 12 min. |
| 141 | 60.6 | 9 min. | 10 min. |
| 142 | 61.1 | 8 min. | 8 min. |
| 143 | 61.7 | 6 min. | 6 min. |
| 144 | 62.2 | 5 min. | 5 min. |
| 145 | 62.8 | 4 min.* | 4 min.* |
| 146 | 63.3 | 169 sec. | 182 sec. |
| 147 | 63.9 | 134 sec. | 144 sec. |
| 148 | 64.4 | 107 sec. | 115 sec. |
| 149 | 65.0 | 85 sec. | 91 sec. |
| 150 | 65.6 | 67 sec. | 72 sec. |
| 151 | 66.1 | 54 sec. | 58 sec. |
| 152 | 66.7 | 43 sec. | 46 sec. |
| 153 | 67.2 | 34 sec. | 37 sec. |
| 154 | 67.8 | 27 sec. | 29 sec. |
| 155 | 68.3 | 22 sec. | 23 sec. |
| 156 | 68.9 | 17 sec. | 19 sec. |
| 157 | 69.4 | 14 sec. | 15 sec. |
| 158 | 70.0 | 0 sec.** | 0 sec.** |
| 159 | 70.6 | 0 sec.** | 0 sec.** |
| 160 | 71.1 | 0 sec ** | 0 sec.** |

*Past regulations have listed the minimum processing time for roast beef cooked to 145° F. as "Instantly." However, due to their large size, most of these roasts dwell at 145° F., or even at higher temperatures, for at least 4 minutes after the minimum internal temperature is reached. FSIS has revised this time/temperature table to reflect this and emphasizes that, to better ensure compliance with the performance standard, establishments should ensure a dwell time of at least 4 minutes if 145° F. is the minimum internal temperature employed.

**The required lethalities are achieved instantly when the internal temperature of a cooked meat product reaches 158° F. or above.

2. Cooked beef, including sectioned and formed roasts and chunked and formed roasts, and cooked corned beef should be moist cooked throughout the process or, in the case of roast beef or corned beef to be roasted, cooked as in paragraph (3) of this compliance guide. Moist cooking may be accomplished by: a) placing the meat in a sealed, moisture impermeable bag, removing the excess air, and cooking; b) completely immersing the meat, unbagged in water throughout the entire cooking process; or c) using a sealed oven or steam injection to raise the relative humidity above 90 percent throughout the cooking process.

3. Roast beef or corned beef to be roasted can be cooked by one of the following methods:

Heating roasts of 10 pounds or more in an oven maintained at 250° F. (121° C.) or higher throughout a process achieving one of the time/temperature combinations in (1) above;

Heating roasts of any size to a minimum internal temperature of 145° F. (62.8° C.) in an oven maintained at any temperature if the relative humidity of the oven is maintained either by continuously introducing steam for 50 percent of the cooking time or by use of a sealed oven for over 50 percent of the cooking time, or if the relative humidity of the oven is maintained at 90 percent or above for at least 25 percent of the total cooking time, but in no case less than 1 hour; or Heating roasts of any size in an oven maintained at any temperature that will satisfy the internal temperature and time combinations of the above chart of this compliance guide if the relative humidity of the oven is maintained at 90 percent or above for at least 25 percent of the total cooking time, but in no case less than 1 hour. The relative humidity may be achieved be use of steam injection or sealed ovens capable of producing and maintaining the required relative humidity.

4. Establishments should have sufficient monitoring equipment, including recording devices, to ensure that the time (accuracy assured within 1 minute), the temperature (accuracy assured within 1° F.), and relative humidity (accuracy assured within 5 percent) limits of these processes are being met. Data from the recording devices should be made available to FSIS program employees upon request.

The embodiments of the invention in which an exclusive property or privilege is claimed are defined as follows:

1. A commercial scale sous-vide cooking method, comprising:

processing a food product to be cooked into uniform thicknesses;

preparing a marinade for injection into the food to be cooked by blending in a liquid solution a quantity of a macerated trim food product that is of the same type as the food product to be cooked;

injecting the prepared marinade into the food product to be cooked;

vacuum packaging a single thickness of the marinated food product to be cooked into a food-grade plastic bag container;

placing the bag container with the marinated food product to be cooked therein on a moving transport system; and operating the transport system to carry the bag container with the marinated food product to be cooked therein through a fluid cooking medium to subject the bag container with the marinated food product to be cooked therein to the fluid cooking medium in a temperature range of 150° F. to 200° F. until a desired level of sous-vide cooking of the marinated food product has occurred;

wherein the transport system includes a conveyor system for conveying the food product through a sous-vide chamber, the conveyor system including a spiral conveyor having a first spiral stack and a second spiral stack both located within the sous-vide chamber, wherein the conveyor system carries the bag container up the first spiral stack then across to the second spiral stack, then down the second spiral stack to perform the commercial scale sous-vide cooking; the sous-vide chamber is heated with saturated steam as the fluid cooking medium which is introduced into the sous-vide chamber by steam inlet lines connected through flow valves, and the sous-vide chamber having an inlet located in a top of the sous-vide chamber between the first and the second spiral stack for supplying air.

2. The method according to claim 1, wherein the food product to be cooked is processed into the uniform thicknesses being a uniform thickness of up to two inches.

3. The method according to claim 1, wherein the uniform thicknesses of the food product to be cooked are achieved by a method selected from the group consisting of blade or knife slicing, water jet cutting and flattening, followed by thermal treatment.

4. The method according to claim 1, wherein: the food product to be cooked defining an exterior thereof; and prior to the vacuum packaging of the food product to be cooked, the exterior of the food product to be cooked is pre-treated to achieve a desired exterior surface condition or texture or appearance.

5. The method according to claim 4, wherein the pretreating of the exterior of the food product to be cooked includes one or more of the steps of: (a) subjecting the exterior of the food product to be cooked to a radiant, conductive, or convective heat source of at least 500° F.; (b) searing the exterior surface of the food product to be cooked at a temperature of at least 1000° F.; (c) applying medium wavelength infrared radiation temperature of 1400° F.

6. The method according to claim 1, wherein the conveyor is disposed within a housing.

7. The method according to claim 6, wherein the saturated steam is added to the housing to maintain the cooking medium temperature within the housing at a desired level.

8. The method according to claim 1, further comprising monitoring the temperature of the fluid cooking medium, and adjusting the temperature of the fluid cooking medium so as to maintain the temperature of the cooking medium at a desired temperature level.

9. The method according to claim 1, further comprising chilling or freezing the food product to be cooked after the sous-vide cooking of the food product to be cooked has occurred.

10. The method according to claim 1, further comprising controlling at least one process parameter pertaining to the commercial scale sous-vide cooking method selected from the group consisting of: the temperature of the cooking medium, a percentage of steam of the cooking medium, a flow rate of the cooking medium, a moisture level of the cooking medium, a loading level of the food product to be cooked on the moving transport system, and the movement of the transport system.

11. The method of claim 1, wherein an amount of the marinade injected into the food product to be cooked is selected so as to achieve a uniform final weight of the food product to be cooked after sous-vide cooking regardless of the level of sous-vide cooking applied to the food product to be cooked.

12. The method of claim 1, wherein the food product to be cooked is a type of meat, fish, or poultry, and the marinade is composed of the same type of meat, fish, or poultry as the food product to be cooked.

* * * * *

UNITED STATES PATENT AND TRADEMARK OFFICE
CERTIFICATE OF CORRECTION

| | |
|---|---|
| PATENT NO. | : 12,082,735 B2 |
| APPLICATION NO. | : 15/883512 |
| DATED | : September 10, 2024 |
| INVENTOR(S) | : R. Gunawardena et al. |

Page 1 of 1

It is certified that error appears in the above-identified patent and that said Letters Patent is hereby corrected as shown below:

In the Claims

| Column | Line | |
|---|---|---|
| 19 | 38 | change "cooked are" to -- cooked is -- |

Signed and Sealed this
Sixth Day of May, 2025

Coke Morgan Stewart
*Acting Director of the United States Patent and Trademark Office*